United States Patent [19]
Huvey et al.

[11] 3,790,418
[45] Feb. 5, 1974

[54] PROCESS FOR MAKING A TIGHT COATING AROUND A PIPE FOR CONVEYING HYDROCARBONS AND THE RESULTING HYDROCARBON CONVEYING PIPE LINE

[75] Inventors: Michel Huvey, Bougival; Germain Le Meur, Stains, both of France

[73] Assignees: Institut Francais Du Petrole, des Carburants et Lubrifiants, Rueil-Malmaison; Societe Anonyme Pour Tous Apparcillages Mecaniques S. A. J. A. La Courneuve, La Courneuve (Seine-Saint-Denis), both of, France

[22] Filed: Oct. 8, 1971

[21] Appl. No.: 187,787

[30] Foreign Application Priority Data
Oct. 14, 1970 France .............................. 70.37203

[52] U.S. Cl................. 156/79, 137/375, 137/97, 137/144, 156/94, 156/195, 161/160, 161/405, 264/45
[51] Int. Cl............................................. B32b 5/18
[58] Field of Search.. 156/324, 79, 94, 195; 138/97, 138/144; 161/159, 160, 405; 264/45; 137/375

[56] References Cited
UNITED STATES PATENTS
| | | | |
|---|---|---|---|
| 3,144,049 | 9/1964 | Ginsbursh | 138/97 |
| 3,207,711 | 9/1965 | Spenadel et al. | 260/2.5 |
| 3,340,209 | 9/1967 | Riley et al. | 260/2.5 |
| 3,451,696 | 6/1969 | Haselin et al. | 264/45 X |

*Primary Examiner*—Edward G. Whitby
*Attorney, Agent, or Firm*—Craig, Antonelli & Hill

[57] ABSTRACT

Process for the formation in situ of a tight coating of pores containing material between a hydrocarbon conveying pipe and a protecting envelope surrounding the same, said material being expansible by contact with the conveyed hydrocarbon so as to obstruct any perforation accidentally occurring in the pipe wall, said process comprising covering the pipe with a sheath of said expansible material containing a curing agent and a porophoric agent, placing the envelope around the pipe and heating the sheath by circulation of a heating fluid so as to produce simultaneously the curing of the sheath and the formation of pores therein by expansion of the sheath in the annular space provided between the pipe and the envelope.

7 Claims, 5 Drawing Figures

PATENTED FEB 5 1974 3,790,418

PROCESS FOR MAKING A TIGHT COATING AROUND A PIPE FOR CONVEYING HYDROCARBONS AND THE RESULTING HYDROCARBON CONVEYING PIPE LINE

This invention relates to a process for making a tight coating around a pipe for conveying hydrocarbons.

In order to avoid the pollution of the ground and the underground waters there may be deemed of interest to make use of double pipings for conveying hydrocarbons such as gasoline or gas-oil, such pipings being also usable for improving the safety conditions even if they are not underground, when the hydrocarbons conveyed therethrough are under pressure.

Under these conditions, in the case of perforation of the internal piping due to the corrosion, the external piping forming an envelope is supposed to insure the sealing.

However, in the case of underground pipings, the internal piping which is subjected to corrosion only to a small extent when it conveys refined hydrocarbons, since it is otherwise protected against the corrosion from the ground by the external envelope, will be corroded after a long time whereas the external envelope, which is subjected to the action of stray currents and of the ground attacking agents, will be corroded and perforated much before the internal piping. Accordingly the protection will not be efficient.

The use of a liquid or gas under slight pressure, filling the annular space between the two pipes makes it possible by using any pressure gage, to detect a leakage of the internal tube as well as of the external envelope and to give the alarm.

This alarm system will however operate automatically in response to any perforation of the external envelope, which will put out of service the piping and the distribution of the product conveyed therethrough while the sealing of the internal piping remains unaffected.

Moreover, with the use of such an alarm system, the piping can be put again into service only after having detected the location of the perforation in the external envelope or in the internal piping and having repaired the same, this being very difficult to carry out in the case of an underground piping.

This invention has for object a process whereby such drawbacks can be avoided and which provides a tight coating around a piping for conveyance of hydrocarbons, said coating being placed in the annular space between the piping and the tubular envelope externally surrounding said piping and consisting of a sheath of foam of a material capable of stopping the hydrocarbon leak by a choking resulting from an expansion thereof when contacted with hydrocarbons, said expansion being absorbed, at least partly, by the pore volume of sheath.

Such a coating may however be difficult to put in when the piping comprises turns since in such a case the coating must be made of two sections each in the form of a half shell, thus arising the problem of making a tight connection of these two sections.

It is accordingly a major object of the invention to provide a process for performing in an easy manner such a sealing of the hydrocarbon conveying pipe even when said pipe comprises one or more turns, said process comprising the production in situ of the foam forming the sheath, after the external envelope has been placed around the pipe.

These objects are achieved, according to the invention, by a process for forming in situ a tight coating around the hydrocarbon conveying pipe, said coating being located in the annular space between the pipe and an external protecting envelope, and consisting of a sheath of pores including material, capable of stopping a hydrocarbon leak due to a perforation of the pipe, by a choking resulting from the expansion of said material when contacted with hydrocarbons, said expansion being at least partly absorbed by a reduction in the pore volume of the sheath, said process further comprising the combination of the following successive steps of:

a. covering the pipe with a sheath of expansible material to which is incorporated at least one curing agent and at least one porophoric agent, said sheath covering substantially the whole length of the pipe on its entire periphery;

b. placing the tubular envelope around said sheath, and c. subjecting said sheath to a thermal treatment by circulating through the pipe a heating fluid at a temperature and for a period so selected as to produce the curing of the sheath, together with the formation in situ of stable pores within said sheath by expansion in the annular space between the pipe and its envelope.

A non-limitative embodiment of the invention will be described more in detail with reference to the accompanying drawings wherein:

FIGS. 1 and 2 respectively illustrate the two first steps of the process according to the invention;

The first step of placing the sealing sheath around the hydrocarbon conveying pipe may be carried out by the winding of a strip 2 made of expansible material such as a raw gum of elastomer, e.g. butyl rubber, to which has been incorporated at least one porophoric agent, i.e., a product which is capable, by the effect of a sufficient temperature, to transform the material of which the strip is initially made, into a foam with stable pores, this material being expansible by contact with hydrocarbons.

The porophoric product incorporated to the raw gum forming the strip 2 will be, for example an azoic derivative or the conventional mixture of bicarbonate with citric acid. There will be also incorporated to the strip material one or more curing agents, such as a product composed of sulphur and eventually an accelerative curing agent such as a zinc dialkyldithiocarbamate.

Figure 3:
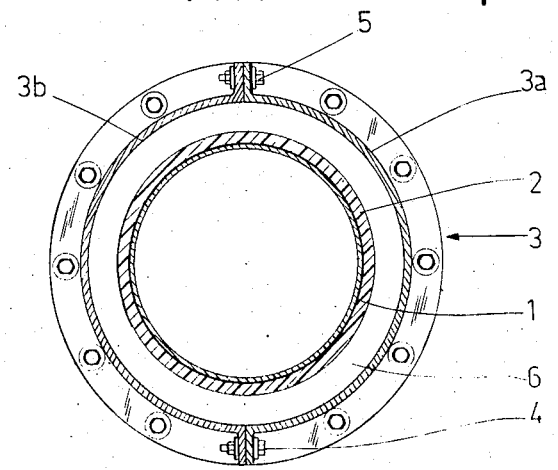
FIG. 3 is a cross-sectional view of the pipe, along line AA of FIG. 2, showing the sealing sheath surrounding the pipe, before its thermal treatment in situ.

The strip 2 is wound around the whole length of the pipe 1 and a protecting envelope 3 is placed around the pipe, said envelope being optionally formed of tubular elements in half shells such as 3a and 3b (FIG. 3) which are assembled by bolts (4 and 5).

The internal diameter of the protecting envelope 3 will be chosen greater than the external diameter of the pipe 1 covered by the strip 2, so as to leave a free annular space 6 for expansion of the material of which the strip 2 is made, during a subsequent thermal treatment.

Figure 4:
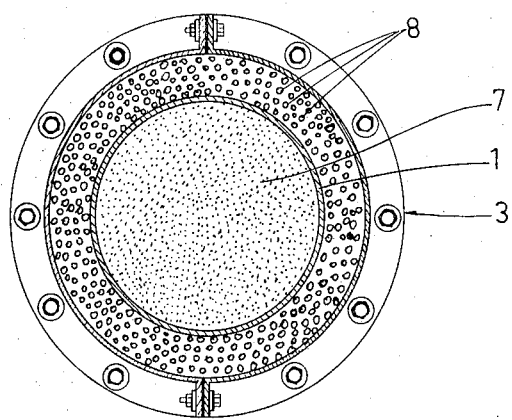
FIG. 4 shows, in the same cross-sectional view, the aspect of the sheath after the thermal treatment.
Figure 5:
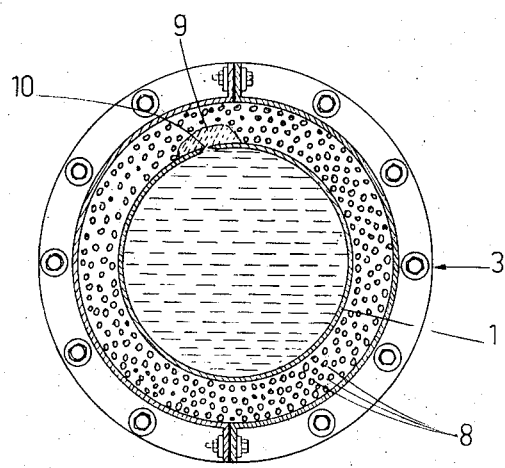
FIG. 5 illustrates the mechanism of self-choking of a hydrocarbon leakage performed by the sealing sheath.

When the assembling is completed, a heating fluid 7, (FIG. 4) such as pressurized steam at about 150°C, is caused to pass through the pipe.

This thermal treatment produces the curing of the strip 2 and the expansion of the material forming the same in annular space 6 while forming therein stable pores 8. During this thermal treatment the melting of the rubber transforms the strip winding into a completely sealed sheath surrounding the pipe 1 over its whole length.

In the case of a perforation occurring in the envelope 3, nothing will happen since butyl rubber is not liable to deterioration by the action of the water and the ground (in case of an underground pipe).

On the contrary in the event of a perforation occurring in pipe 1, the sheath 2 formed by thermal treatment will be in contact with hydrocarbons and said contact will produce the expansion of the butyl rubber, thereby resulting in the disappearance of the pores previously formed by thermal treatment, the foam rubber being thus transformed, at least locally, in the region 9 in the vicinity of the perforation in the pipe 1 (orifice 10), to a solid and tight material. A phenomenon of self-sealing is thus observed.

According to a preferred embodiment of the invention preventing the action of stresses on the pipe 1 or on its protecting envelope during the expansion resulting from the contact of elastomer with hydrocarbons, thereby preventing any extrusion of the elastomer towards the inside of the pipe 1, through the orifice 10, an annular space 6 will be left free when laying the strip 2, before the thermal treatment (FIG. 3), said free space having a volume substantially equal to the volume increase resulting from the expansion of the butyl rubber when contacted with hydrocarbons.

Under these conditions the thermal treatment will generate, within the annular space between the pipe 1 and its envelope 3, a foam rubber having a total volume of pores sufficient for completely absorbing the rubber volume increase in case of hydrocarbon leak.

Figure 1:
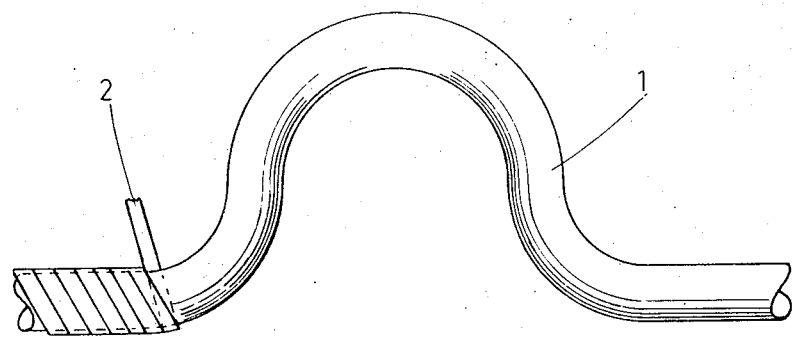
Figure 2:
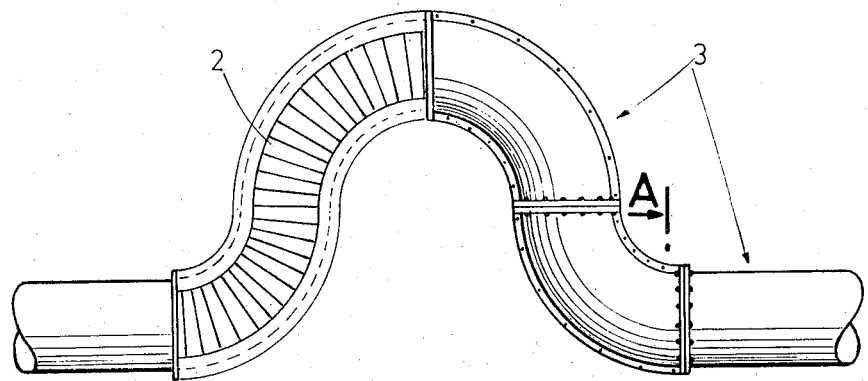

In particular, in the case where the butyl rubber used has an expansion coefficient of about 200 percent when contacted with a petroleum product such as gasoline, premium gasoline or gas-oil, the strip 2 (FIG. 1) will be chosen of an initial thickness, as it is laid the pipe, such that the annular space 6 left free between the strip 2, the pipe 1 and the envelope 3, be substantially twice the initial volume of the strip 2.

Subsequently the butyl rubber will become, during the thermal treatment (FIG. 4) a foam rubber with 66 percent of pore volume when filling completely said annular space 6.

More generally, $n$ being the expansion coefficient in percent of the material of which the sheath is made when contacted with hydrocarbons conveyed through the pipe, and $V$ being the volume per length unit of the annular space between the pipe 1 and its protecting envelope 3 before putting into place the sheath 2, the initial volume of the sheath, as it is laid on the pipe, per length unit of pipe, will preferably not exceed $100 \cdot V/n+100$, so that the the expansion of the material forming the sheath 2, when contacted with hydrocarbons, be completely absorbed by the voids of the pores 8.

Amongst the materials which can be used for the formation of the sealing sheath 2, there can be mentioned in a non-linitative way, in addition to the butyl rubber, the natural rubbers, polychloroprene, polybutadienes, unsaturated ethylenes-propylenes, polyepoxypropane, urethane and the like.

The selected elastomers must not contain substantial amounts of usual plasticizers soluble in the hydrocarbons conveyed through the pipe 1, said plasticizers being optionally heavy hydrocarbon fractions (heavy, naphthenic, aromatic oils), esters such as butyl- or isooctyl-phthalates, halogenated hydrocarbons, particularly chlorinated paraffins. These undesirable plasticizers are of common use in the foam rubber compositions in view of making easier their extrusion but, in the process of the invention, it is not necessary to extrude the sheath 2 since the latter can be formed in situ by the mere winding of a strip around the pipe 1 (FIG. 1), this operation being easy to perform, even when the pipe presents numerous turns, the strip to be winded being obtainable itself directly from a mixing calender without requiring obligatorily an extrusion operation.

For each couple elastomer-conveyed hydrocarbon, the maximum expansion rate of the elastomer in the hydrocarbon is determined and the corresponding volume of raw gum to be used in each case is deduced therefrom so as to obtain the required expansion rate during the thermal treatment in situ which gives a sufficient volume of the pores.

In the case where the gum used does not sufficiently adhere to the material wherefrom the tube is made, a fastening layer of a material substantially insensitive to the action of hydrocarbons will be interposed between the pipe 1 and the sheath 2, said material preventing the passage of the hydrocarbon between the sheath and the pipe.

By way of non-limitative example there can be used a primary layer of epoxide resin to which is incorporated a suitable hardening agent which provides it with the fastening properties with respect to the gum. It has been further discovered that the best protection against the hydrocarbon leak was obtained when the diameter of the pores formed within the material which constitutes the sheath did not exceed 10 percent of the foam thickness in the sheath formed according to the process of the invention.

The protecting envelope 3 for the pipe may be a tight envelope or may be formed by helical winding of an armature around the sheath 2.

However a tight sheath seems to be more advantageous, to the extent that it prevents bacteria from the ground to destroy the material forming the sheath 2, in the case of an underground pipe.

From the foregoing description, one skilled in the art can easily ascertain the essential characteristics of this invention and, without departing from the spirit and scope thereof, can make various changes and modifications of the invention to adapt it to various usages and conditions. Consequently such changes and modifications are properly, equitably and intended to be within the full range of equivalence of the following claims.

What we claim is:

1. A process for the formation in situ of a tight coating around a hydrocarbon-conveying pipe, said coating being located in an annular space between the pipe and an envelope externally protecting said pipe and consisting of a sheath made of material containing pores that is capable of stopping a hydrocarbon leak due to a perforation of the pipe, by the choking resulting from an expansion of said material when contacted with hydrocarbons, said expansion being at least partly absorbed by a volume decrease of the pores in the sheath, said process comprising the following successive steps of:

a. covering the pipe with a sheath of expansible material to which is incorporated at least one curing agent and at least one porophoric agent, said sheath covering substantially the whole length of the pipe on its entire periphery;

b. placing a tubular envelope around said sheath, and c. subjecting said sheath to a thermal treatment by circulating through the pipe a heating fluid at a temperature and for a period so selected as to produce the curing of the sheath, together with the formation in situ of stable pores within said sheath by expansion in the annular space between the pipe and said envelope; the volume, per unit length of the pipe, of said sheath of expansible material, before said thermal treatment, not exceeding:

$$100 \, [V/n + 100]$$

wherein $V$ is the volume per unit length of the annular space between the pipe and the protecting envelope before the sheath is put into place and $n$ being the expansion coefficient in percent of the material forming the sheath when contacting the hydrocarbons conveyed through the pipe to thereby generate in said expansible material a sufficient volume of pores to insure the complete absorption of the expansion resulting from the contact with the hydrocarbons by the volume of the sheath pores, whereby any possible bursting of the protecting envelope in case of hydrocarbon leak is prevented.

2. A process for the formation in situ of a tight coating around a hydrocarbon-conveying pipe, said coating being located in an annular space between the pipe and an envelope externally protecting said pipe and consisting of a sheath made of material containing pores that is capable of stopping a hydrocarbon leak due to a perforation of the pipe, by the choking resulting from an expansion of said material when contacted with hydrocarbons, said expansion being at least partly absorbed by a volume decrease of the pores in the sheath, said process comprising the following successive steps of:

a. covering the pipe with a sheath of expansible material, to which is incorporated at least one curing agent and at least one porophoric agent, by winding of a strip of said expansible material around said pipe, said sheath covering substantially the whole length of the pipe on its entire periphery;

b. placing a tubular envelope around said sheath, and c. subjecting said sheath to a thermal treatment by circulating through the pipe a heating fluid at a temperature and for a period so selected as to produce the curing of the sheath, together with the formation in situ of stable pores within said sheath by expansion in the annular space between the pipe and said envelope.

3. A process for the formation in situ of a tight coating around a hydrocarbon-conveying pipe, said coating being located in an annular space between the pipe and an envelope externally protecting said pipe and consisting of a sheath made of material containing pores that is capable of stopping a hydrocarbon leak due to a perforation of the pipe, by the choking resulting from an expansion of said material when contacted with hydrocarbons, said expansion being at least partly absorbed by a volume decrease of the pores in the sheath, said process comprising the following successive steps of:

a. placing a fastening layer on said pipe;

b. covering the pipe with a sheath of expansible material to which is incorporated at least one curing agent and at least one porophoric agent, said sheath covering substantially the whole length of the pipe on its entire periphery;

c. placing a tubular envelope around said sheath, and d. subjecting said sheath to a thermal treatment by circulating through the pipe a heating fluid at a temperature and for a period so selected as to produce the curing of the sheath, together with the formation in situ of stable pores within said sheath by expansion in the annular space between the pipe and said envelope.

4. A process according to claim 1, wherein said expansible material is an elastomer.

5. A process according to claim 4, wherein said elastomer is butyl rubber.

6. A process according to claim 4, comprising the elastomer is a raw gum substantially free from any plasticizer capable of being dissolved in hydrocarbons.

7. A process according to claim 1 wherein the diameter of said sheath pores is at most ten percent of the sheath thickness.

* * * * *